O. F. SAETER AND E. O. HARRIS.
FASTENER FOR MUD CHAINS.
APPLICATION FILED DEC. 16, 1920.

1,408,309.

Patented Feb. 28, 1922.

Inventors
Olav F. Saeter and
Edwin O. Harris,
By William C. Sinton.
Attorney

UNITED STATES PATENT OFFICE.

OLAV F. SAETER AND EDWIN O. HARRIS, OF FERGUS FALLS, MINNESOTA.

FASTENER FOR MUD CHAINS.

1,408,309.

Specification of Letters Patent.   Patented Feb. 28, 1922.

Application filed December 16, 1920.   Serial No. 431,248.

*To all whom it may concern:*

Be it known that we, OLAV F. SAETER and EDWIN O. HARRIS, citizens of the United States, and residents of Fergus Falls, county of Otter Tail, and State of Minnesota, have invented certain new and useful Improvements in Fasteners for Mud Chains, and we do hereby declare that the following is a full, clear, and exact description of the invention, such as will enable others skilled in the art to which it appertains to make and use the same.

The present invention relates to non-skid chains for pneumatic tires of automobiles, and more particularly to a connector for fastening the ends of the chains together.

It is the purpose of the present invention to provide a tread-chain connector which may be easily and readily attached to the ordinary non-skid chains so that the chains may be easily secured to the pneumatic tires, or the chains may be easily and readily removed therefrom without the use of any special tools, and when once applied the chains may be easily tightened and held taut.

The invention seeks to further provide a connector of this character wherein the various projecting parts thereof will be concealed and prevented from coming into contact with the tire so as to eliminate any possibility of injuring the same, and one which will be comparably inexpensive in the cost of manufacture, also strong, durable and efficient in use.

With the above and other objects in view, the invention consists of two separable fastening elements which may be applied to the ends of a non-skid chain for pneumatic automobile tires so that the ends of the chains may be connected together, and other combinations, formations and arrangements of parts will be hereinafter more fully described and particularly pointed out in the appended claims.

Figure 1:
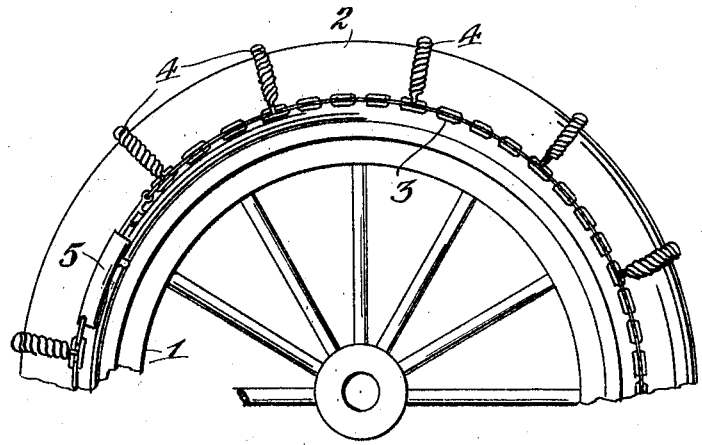
Figure 1 is a side elevation of a portion of an ordinary automobile wheel having a non-skid chain applied thereto and showing the position and the manner in which the connector is used.
Figure 2:
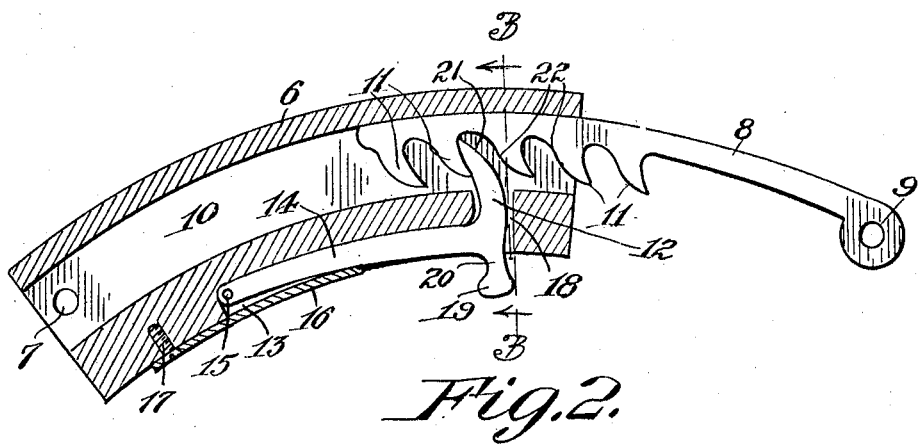
Figure 2 is an enlarged detail section of the connector.
Figure 3:
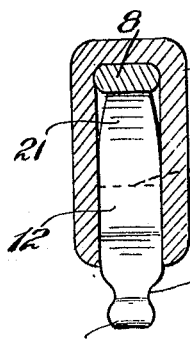
Figure 3 is a transverse section through the same taken on the line 3—3 of Figure 2.

Referring now more particularly to the drawings, wherein like and corresponding parts are designated by similar reference numerals throughout the several figures, the numeral 1 indicates an ordinary automobile wheel having a pneumatic tire 2 applied thereto. Secured to the tire in the manner as shown, is a non-skid chain which consists of the usual latterly spaced flexible side chains 3 and the transverse chains or cables 4. The opposite ends of the side chains 3 are usually connected by suitable fastening members or by the connector embodying the present invention which is generally illustrated as at 5. It is necessary that these chains be retained tightly upon the tire to prevent the chains from injuring the tire and losing their traction power. As the pneumatic tires and the chains vary in sizes, it is necessary to have an adjustable connector so that the chains may at all times be held taut, and this connector must be so constructed and arranged as to avoid any sharp projecting points or edges which are liable to come into contact with the tire casing and thereby injure the same. The connector as herein shown comprises a sleeve 6 having a thick lower wall and a comparatively thinner upper wall and an arcuate configuration and provided with an eyelet 7 to which is connected one end of the side chain 3. The other separable element of the connector consists substantially of a rack bar 8 which is also preferably of an arcuate configuration having an eyelet 9 formed with one end thereof to which is connected the opposite end of the side chain 3. The sleeve 6 is provided with a curved bore 10 and in which is adapted to rest the rack bar 8. This rack bar section of the connector has formed with the free end thereof a plurality of depending lugs or teeth 11 which extend in the direction as is illustrated in Figure 2. A hammer-shaped pawl 12 is carried by the sleeve 6 and is adapted to engage the teeth 11 of the rack bar so as to adjustably and detachably connect the separable sections of the connector together.

The sleeve 6 is provided with a recess 13 in its lower face so that the handle portion 14 of the pawl may rest therein, and one end of this handle 14 is pivotolly connected to the sleeve 6 as at 15. A leaf spring 16 has one end fastened by means of a set screw 17, as shown, to the sleeve 6, and its opposite or free end rests upon the lower face of the handle 14 so as to normally hold this pawl in the position as shown in Figure 2. This pawl is adapted to project through an opening 18 formed within the sleeve 6 so as to extend within the bore 10 and engage the teeth 11 of the rack bar. A knob or head 19 is also a part of this hammer-shaped pawl, and is provided with a reduced neck portion 20 so that the operator may easily and readily grasp this knob for moving the pawl against the tension of the spring 16 for releasing the rack bar 8 when it is desirable to disconnect the tread-chain from the tire. It will also be noted that the opposing faces of the pawl 12 and teeth 11 are curved as at 21 and 22 respectively so that when it is desired to tighten the tread-chain the rack bar may be forced within the sleeve 6 whereby the curved faces 22 of the teeth 11 may ride upon the curved face 21 of the pawl, thereby depressing the pawl so that the teeth may pass thereby, and the leaf spring 16 normally tends to force the pawl within the bore 10 so as to prevent the teeth from being withdrawn unless this pressure is removed by manually grasping the knob 19 and pulling the pawl from this bore 10.

From the foregoing, it is obvious that this tread-chain connector may be easily and readily applied to most any non-skid chain and that the chains may be easily tightened and retained in this tightened position. As the rack bar and pawl are enclosed within the casing 6 there are no projecting parts which are liable to come into contact with the tire casing and cause injury to the same.

It is also apparent that the pawl may be easily moved so as to release the rack bar and permit the tread-chains to be disconnected from the tire.

Having thus described our invention, what we claim as new is as follows:

A tread-chain connector for vehicle tires comprising a segmental sleeve the curvature of which corresponds to that of the tires tread, said sleeve having an arcuate bore therein the curvature of which is parallel to that of the sleeve, means whereby one end of the tread-chain may be connected to said sleeve in alignment with said bore, an arcuate rack bar having the opposite end of the tread-chain connected thereto, the lower wall of said sleeve being greater in thickness than the remaining walls thereof, a hammer-shaped pawl, a leaf spring for normally holding said pawl within a recess formed within said lower wall of the sleeve, means for pivotally connecting one end of said pawl to said sleeve, said rack bar adapted to be inserted within said bore and be engaged by said pawl and a knob formed with said pawl whereby it may be manually disengaged from said rack bar.

In witness whereof we have hereunto set our hands.

OLAV F. SAETER,
EDWIN O. HARRIS.